United States Patent [19]
Moore

[11] 3,829,976
[45] Aug. 20, 1974

[54] METERING DEVICE FOR INDICATING THE LENGTH OF FLAT FLEXIBLE MATERIAL

[76] Inventor: Arthur Ronald Moore, 3512 Hilly Ln., Elkhart, Ind. 46514

[22] Filed: Dec. 30, 1971

[21] Appl. No.: 213,983

[52] U.S. Cl. ............................. 33/134 R, 33/141 F
[51] Int. Cl. .......................... G01b 3/12, G01b 5/04
[58] Field of Search .......... 33/129, 133, 134, 141 R, 33/141 F

[56] References Cited
UNITED STATES PATENTS

| | | | |
|---|---|---|---|
| 1,097,098 | 5/1914 | Kachel | 33/134 R |
| 1,415,483 | 5/1922 | Reichmann | 33/141 F |
| 1,614,605 | 1/1927 | Egert | 33/134 R |
| 2,401,576 | 6/1946 | Mason | 33/134 R |
| 2,689,610 | 9/1954 | Myers | 33/129 |
| 2,739,387 | 3/1956 | Scheidt | 33/134 R |
| 3,190,005 | 6/1965 | Smith et al. | 33/134 R |

FOREIGN PATENTS OR APPLICATIONS

| | | | |
|---|---|---|---|
| 404,588 | 1/1934 | Great Britain | 33/129 |
| 5,026 | 1901 | Great Britain | 33/134 R |
| 520,579 | 3/1955 | Italy | 33/141 F |
| 115,871 | 1/1930 | Austria | 33/129 |

Primary Examiner—Harry N. Haroian
Attorney, Agent, or Firm—Oltsch & Knoblock

[57] ABSTRACT

A metering device constituting a flat belt supported upon rollers. Flat flexible material is passed over the belt in frictional contact with the upper run of the belt, causing rotation of the belt. The belt is connected to an indicator or counter which is correlated to the rotation of the belt so as to indicate the length of the material passing over the belt.

9 Claims, 6 Drawing Figures

INVENTOR.
ARTHUR R. MOORE
BY Oltsch & Knoblock
ATTORNEYS

INVENTOR.
ARTHUR R. MOORE
BY Oltsch & Knoblock
ATTORNEYS

INVENTOR.
ARTHUR R. MOORE
BY
Oltsch & Knoblock
ATTORNEYS

METERING DEVICE FOR INDICATING THE LENGTH OF FLAT FLEXIBLE MATERIAL

BACKGROUND OF THE INVENTION

This invention relates to a metering device for indicating the length of flat flexible material and will have particular application in the measurement of carpet lengths.

Heretofore in the carpet manufacturing industry it has been the common practice to meter or measure a length of carpet pulled from a carpet stock roll prior to cutting by means of a metering wheel which engages a flat surface of the carpet. Due to the circular circumference of the metering wheel and the weight of the carpet upon the wheel, the carpet will experience a significant flexure at the wheel which in turn causes an inaccuracy in the measurement. Inaccuracies in the order of four to six inches for every 100 feet of measured carpet are common when using presently available prior art carpet measuring devices. To compensate for these inaccuracies, it is common practice for carpet manufacturers to add an additional one-half foot or more of material to each carpet section so as to be certain that the customer does not receive a carpet having a length which is shorter than that specified. This additional material added to each carpet section costs the carpet manufacturers many dollars a year.

The metering device of this invention overcomes the inaccuracies of the prior art metering wheel devices utilized in the measurement of carpet and enables the carpet manufacturer to measure each 100 feet of carpet within an accuracy of at least one-half inch.

SUMMARY OF THE INVENTION

The metering device of this invention includes an endless rotative flat belt which is carried within an opening in a supporting means, such as a table. The belt includes an upper supported run which parallels the direction of advancement of flexible material, such as carpet, across the supporting means. The upper run of the belt in projecting slightly above the upper surface of the supporting means so as to ensure frictional contact with the lower surface of the flexible material is constructed so that substantially rectilinear contact occurs between the flexible material and the belt. As the material advances across the support means and contacts the belt, rotative movement of the belt in relationship to the length of material passing thereover takes place. The belt is passed about rotative members to which a length indicator is operatively coupled. The indicator is correlated to the movement of the belt and furnishes the user of the metering device with a reliable indication of the length of the material as it passes over the belt.

It has been found that in utilizing the metering device of this invention for the purpose of cutting selected lengths of carpet from a carpet stock roll, there was only a one-fourth inch error in length for a 65 foot rubber-backed carpet and no error in length for a 45 foot jute-backed carpet. Additionally, the metering device of this invention is constructed so as to be simply maintained as well as being of reliable accuracy.

Accordingly, it is an object of this invention to provide a measuring device which is for use in determining the length of flat flexible material and which is of reliable accuracy and economical construction.

Another object of this invention is to provide a metering device for indicating the length of textile material.

Still another object of this invention is to provide a metering device for determining the length of carpeting in preparation for sizing said carpeting.

Another object of this invention is to provide an accurate metering device which is forindicating the length of flat flexible material and which is of simple maintenance.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
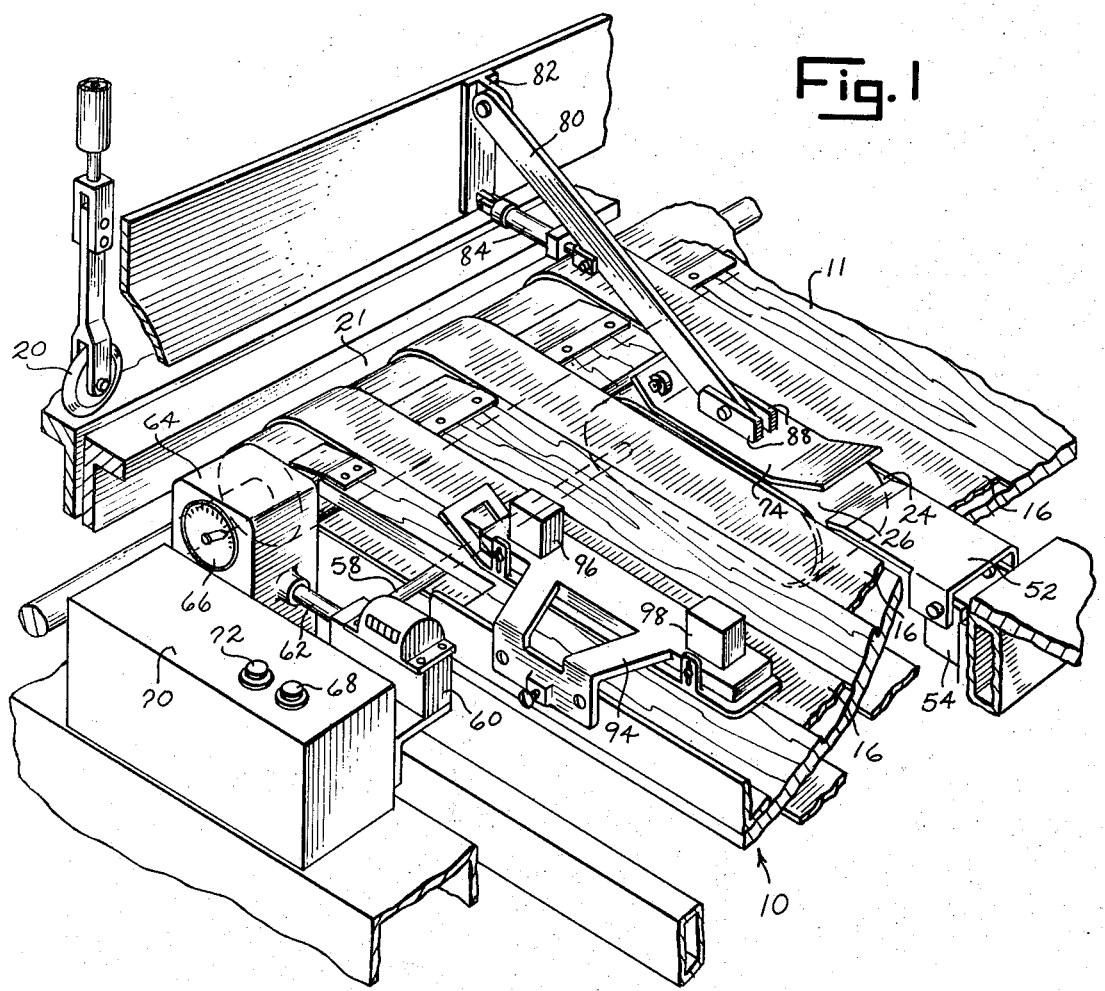
FIG. 1 is a fragmentary perspective view showing the metering device of this invention forming a part of a carpet cutting machine.
Figure 2:
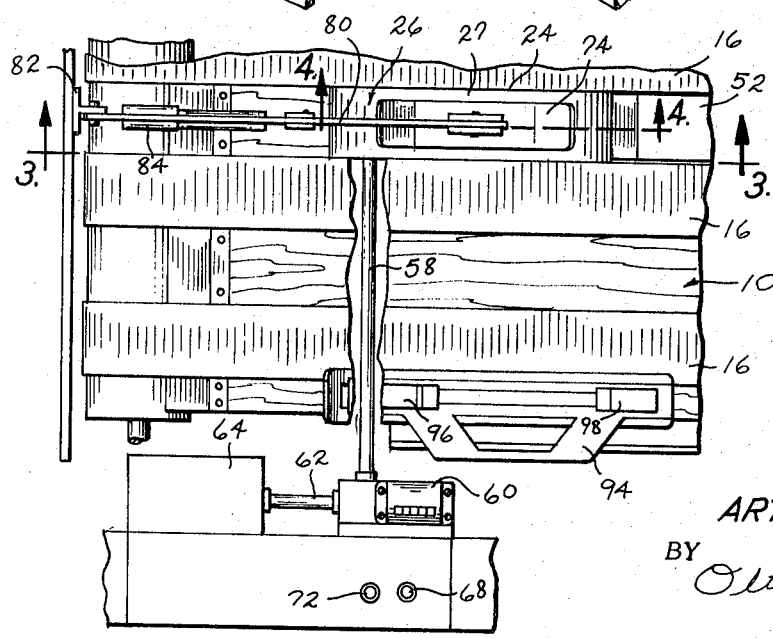
FIG. 2 is a fragmentary top plan view of the metering device shown in FIG. 1.
Figure 3:
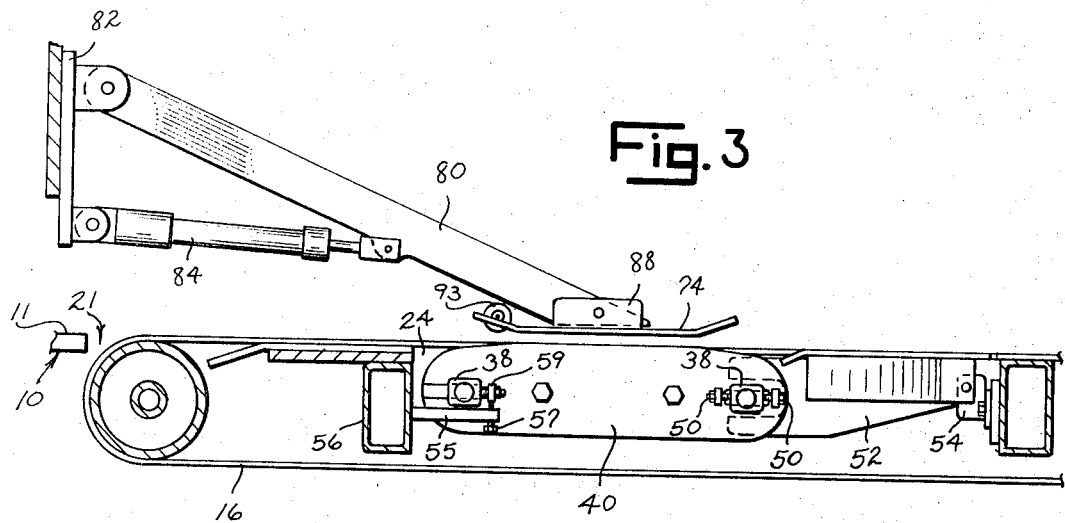
FIG. 3 is a sectional view taken along line 3—3 of FIG. 2.
Figure 6:
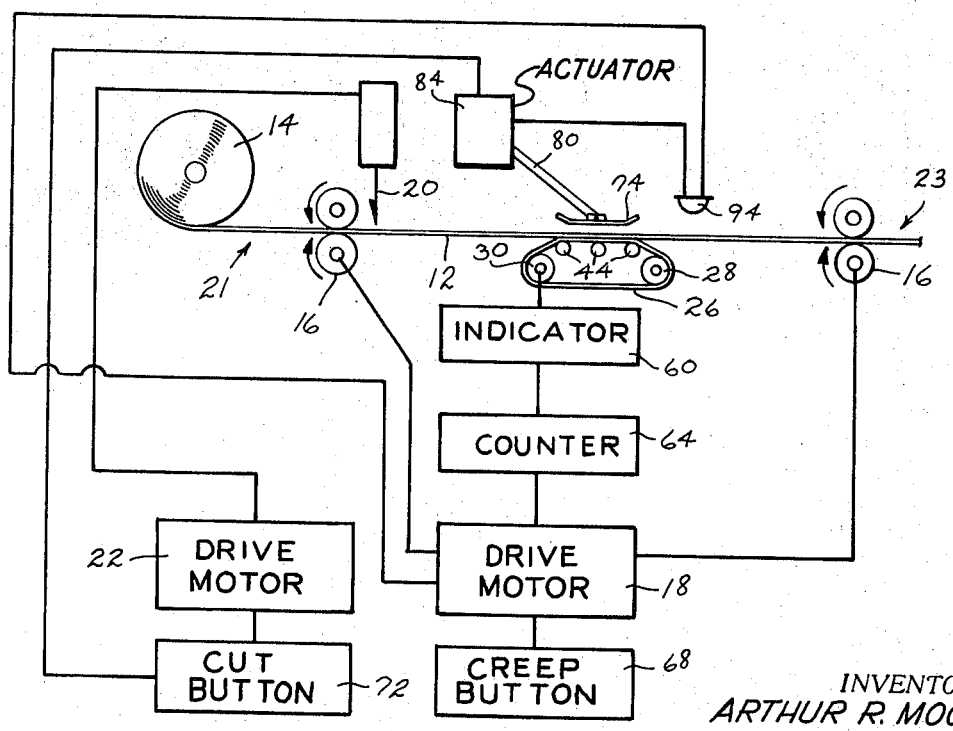
FIG. 6 is a schematic view of the carpet cutting machine of FIG. 1.

The carpet cutting machine illustrated in the drawings includes a table 10 upon which the free end portion 12 of the carpet is supported as it is pulled from a carpet stock roll 14 (shown schematically in FIG. 6). As used herein, the term "carpet" includes the term "rug." To pull carpet end portion 12 from roll 14 and to facilitate movement of the carpet end portion across table 10, suitable drive means 16, such as rollers or belts, are disposed adjacent the carpet stock roll and along the table 10 in engagement with the carpet end portion. In FIGS. 1–3, drive means 16 in addition to the feed rolls adjacent the carpet roll includes elongated endless conveyor belts which have their upper runs supported by table 10 and which are powered by a drive motor 18 (shown schematically in FIG. 6). Belts 16, as seen in FIGS. 1 and 2, are laterally spaced across table 10 and have a roughened outer surface for better contacting the lower surface 13 of end portion 12 of the carpet held upon the drive belts by the weight of the carpet. A cutter 20 is carried at the feed end 21 of table 10 and serves upon traverse movement across the table to sever a selected length of carpet end portion 12 from carpet roll 14. Cutter 20 is preferably driven by a separate drive motor 22 (shown schematically in FIG. 6). At the discharge end 23 of table 10 a carpet take-up device (not shown) can be provided to roll and wrap the cut length of carpet end portion 12. The carpet cutting device thus far described is of a standard construction commonly utilized in the art.

A rectangular shaped opening 24 is formed in the upper surface of table 10 spaced between cutter 20 and the discharge end 23 of the table. Opening 24 is positioned between two adjacent drive belts 16 with its longitudinal dimension paralleling the path of advancement of carpet end portion 12 across the table. A belt 26 is positioned within opening 24 and passes over a pair of pulleys or rollers 28 and 30. Rollers 28 and 30 have their axes of rotation transversely oriented relative to the direction of advancement of end portion 12 of the carpet across table 10. Belt 26 includes an upper run 32 and a lower run 34, both paralleling the direction of advancement of the carpet across table 10. Belt 26 constitutes a part of the metering device of this invention, and, as such, the position of the belt relative to table 10 and drive belts 16 is of a primary importance.

Rollers 28 and 30 are each supported upon a shaft 36 which is keyed to the rollers for rotation with the rollers. The end portions of shafts 36 are journaled within bearings 38 carried by spaced parallel side plates 40. Side plates 40 are spaced apart by accurately machined equal length spacers 41 which act as guides for the adjacent drive belts 16. Roller 28 is preferably slightly crowned while roller 30 is preferably flat. A plurality of equal sized cylindrical bearing members 44 are journaled between side plates 40 at the upper margins thereof. Bearing members 44 are slightly spaced apart and extend at right angles to the direction of advancement of carpet end portion 12 across table 10. The axes of bearing members 44 lie in a plane which parallels upper surface 11 of table 10. Bearing members 44 are of equal diametrical dimension and have their upper peripheral edges extending slightly above the level of the upper peripheral edges of rollers 28 and 30. The upper run 32 of belt 26 is supported upon bearing members 44 in a parallel relationship to upper surface 11 of table 10.

Figure 4:
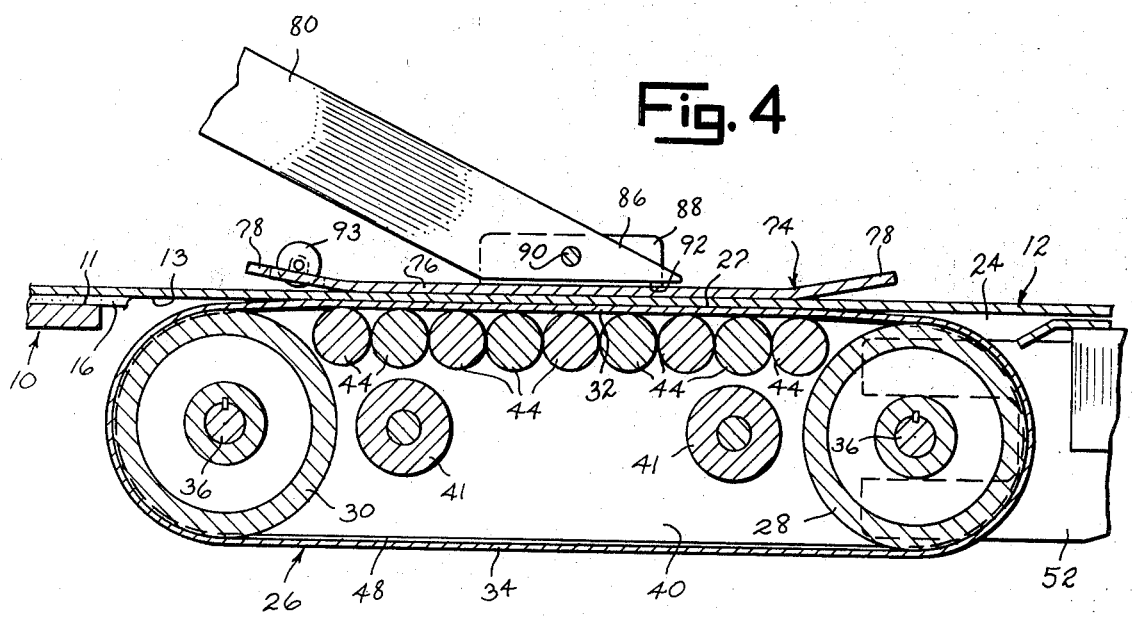
FIG. 4 is an enlarged detailed sectional view taken along line 4—4 of FIG. 2.
Figure 5:
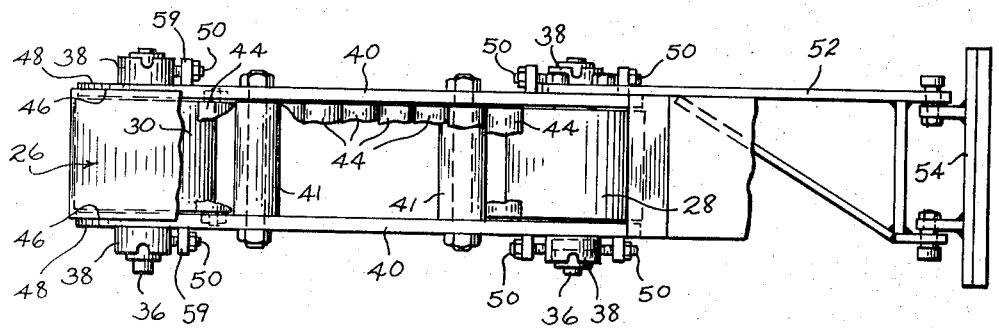
FIG. 5 is a top plan view of the belt assembly of the metering device of this invention shown with portions thereof broken away for purposes of illustration.

As best seen in FIG. 5, the marginal edges 46 of belt 26 overlap at least a portion of the peripheral edges 48 of side plates 40. Peripheral edges 48 of side plates 40 are set in (see FIG. 4) from the outer peripheral edges of rollers 28 and 30 and bearing members 44 so that the marginal edges 46 of the belt are spaced at all points from the peripheral edges of the side plates. The spacing between marginal edges 46 of the belt and peripheral edges 48 of the side plates is slight, preferably approximately 0.015 inches, so as to prevent or at least restrict lint and similar matter from accumulating within the area between side plates 40 and becoming depositied upon the surfaces of rollers 28 and 30 and bearing members 44 where the accuracy of the metering device would be affected. In some constructions of this invention, a positive pressure can be introduced between plates 40 to further retard the influx of lint into the area between the plates. Bearings 38 of roller 28 are adjustably anchored to side plates 40 by opposed adjustment screws 50 which serve to regulate the tension in belt 26 and to allow replacement of the belt when necessary. Additionally, bearings 38 of roller 30 may also be adjustably anchored to side plates 40 by adjustment screws 50.

The belt assembly, which includes belt 26, side plates 40, rollers 28 and 30, and bearing members 44, can be fixedly secured to table 10, or, preferably, fixedly mounted to an arm 52 having one end pivotally connected to a table-mounted bracket 54. Arm 52 permits the belt assembly to be swung from its operative position within table 10 as shown in FIG. 1 to upper generally vertical position for the purpose of maintenance and, if necessary repair. Spaced supports 55 connected at one end to cross support 56 of table 10 extend on opposite sides of belt assembly side plates 40. The opposite end of each support 55 carries a threaded adjustment screw 57 which abuts a tab 59 secured to the adjacent side plate 40 and which supports the belt assembly in its operative position. When the belt assembly is positioned in its operative position within table 10, the upper surface 27 of the bearing member supported belt run 32 will be located in a plane parallel to the upper surface 11 of table 10 and located just slightly above the upper surfaces of drive belts 16. The distance which the upper surface 27 of upper run 32 of the belt extends above the upper surfaces of drive belts 16 is preferably approximately 0.04 inches, or sufficiently just far enough to ensure that the lower surface 13 of carpet end portion 12 makes contact, as best seen in FIG. 4, with the upper run of belt 26 as the carpet end portion is pulled across the table but does not experience any appreciable bending or flexing. The slope of the belt between roller 28 and the adjacent bearing member 44 and roller 30 and its adjacent bearing member 44 is slight, such as in the order of 0.135 inch rise per 1.94 inch of belt. By minimizing the slope of the belt between the rollers 28 and 30 and the bearing members 44, contact between carpet end portion 12 and the upper run 32 of belt 26 is as nearly rectilinear as possible. This substantially rectilinear contact between carpet and metering device belt eliminates nearly all flexure of the carpet as it passes over the belt and thereby accounts for the accuracy of the metering device.

A shaft 58 operatively connects roller 30 of the belt assembly to an indicator 60. Indicator 60 may be of the mechanical type manufactured by Veeder Root of Hartford, Connecticut, and includes a pedometer which is correlated to the revolution of roller 30 to provide a visual read-out of the amount of linear movement of upper run 32 of belt 26 as carpet end portion 12 passes over table 10 and across the belt. Shaft 58 is preferably of the flexible type and has one end removably connected to shaft 36 of roller 30 so as to be detachable when it is desired to lift the belt assembly from opening 24 in table 10. Indicator 60 is operatively connected, such as by shaft 62, to a predetermining counter 64. Predetermining counter 64 is preferably of the electrical type, such as that manufactured by G. W. Eagle Signal of Davenport, Iowa, and includes a dial 66 which can be set to the desired length of carpet section. Counter 64 is electrically coupled to drive motor 18 and is reponsive through its interconnection to roller 30 to the amount of linear travel of the upper run 32 of belt 26. When the upper run 32 of belt 26 has traveled the amount dialed upon counter 64, the counter will cut off drive motor 18, thus stopping all drive means 16 and halting the advancement of end portion 12 of the carpet across table 10.

Depending upon the mechanical and electrical sophistication of the carpet cutting device, counter 64 can stop carpet end portion 12 either at the exact preselected length of the end portion or at a selected distance, such as two inches, short of the preselected length to permit the user of the carpet cutting device to manually activate drive motor 18 to slowly advance the carpet end to the exact desired length. This latter mentioned manual advancement of the carpet end portion to its exact preselected length can be accomplished by having the user of the carpet cutting device depress a button 68 on the control panel 70 which activates drive motor 18 at slow speed to advance the carpet to the desired carpet length as visually shown on indicator 60. Suitable drive motor reversing means can be included to enable the user of the cutting device to reverse the direction of movement of the carpet end portion should the user of the device advance the carpet too far and thus overshoot the desired length. Once the desired length of carpet has been pulled from carpet stock roll 14, as indicated by the metering device of this invention, with the carpet advancement being halted by deactivation of motor 18, the user of the carpet cutting device then depresses a second button 72 which activates drive motor 22 and causes cutter 20 to sever the end portion of the carpet from the carpet stock roll.

To provide good frictional contact between upper run 32 of belt 26 and lower surface 13 of carpet end portion 12 as the end portion is advanced across table 10, the outer surface of the belt preferably has an abrasive texture. The peripheral surface of roller 30 and the inner surface of belt 26 are made of suitable compatible materials so that no slippage occurs between the belt and outer surface of roller 30 during rotation of the belt. A hold-down plate 74 having a flattened center portion 76 and upturned marginal end portions 78 is utilized to assure that firm frictional, non-sliding contact between the upper run 32 of belt 26 and the lower surface 13 of carpet end portion 12 takes place as the carpet is advanced across table 10. Plate 74 is positioned over upper run 32 of belt 26 and is shiftable from a carpet-contacting position, as shown in FIG. 4, to an upper position free from contact with carpet end portion 12. An arm 80 has one end pivotally connected to frame part 82 of the carpet cutting device and its opposite end pivotally connected to plate 74. A pneumatic piston and cylinder actuator 84 is connected to frame part 82 and an intermediate part of arm 80 and serves upon actuation to cause pivotal movement of arm 80 about its connection to the frame part and a raising and lowering of plate 74. The plate-connected end 86 of arm 80 extends with slight clearance between two spaced flanges 88 which are attached to and extend upwardly from plate 74. A pivot pin 90 extends through registering apertures in flanges 88 and arm end 86. Arm end 86 slidably fits upon pin 90 to allow slight lateral movement of the plate relative to the arm and to permit pivotal movement of the plate and the pin relative to the arm. This movement of plate 74 allows the plate to accommodate variations in contour of the upper surface of the carpet as it passes over belt 26. Arm end 86 includes a beveled end face 92 (as best seen in FIG. 4) which is spaced slightly above the upper surface of the plate and which serves to limit the amount of pivotal movement of the plate relative to the arm. A roller 93 is carried at one end portion of plate 74 and serves as a belt-contacting member to prevent frictional contact between the bottom surface of the plate and the upper run 32 of belt 26 when there is no carpet end portion located over the belt.

The raising and lowering of hold-down plate 74 between its carpet contacting position and its upper position is preferably automatically correlated to the sequence of operation of the carpet cutting device. Power actuator 84 is operatively connected to the circuit for actuating cutter 20 so that upon depression of button 72, first cutter 20 will sever the carpet end portion from the stock roll and secondly upon completion of or during the cutting action actuator 84 will cause the plate 74 to be lifted from the cut section of carpet.

Hold-down plate 74 in some constructions of this invention may include a plurality of rollers for engagement with the upper surface of the carpet.

To position carpet end portion 12 to begin the measuring sequence for the cutting operation, the free end of the carpet stock roll 14 is fed onto table 10 by the drive means 16 positioned at the feed end 21 of the table with assistance from drive belts 16. A sensing device 94 is positioned above the upper surface 11 of table 10 and preferably laterally of belt 26. Sensing device 94 includes at least one and preferably two longitudinally spaced electric eyes 96 and 98. Eyes 96 and 98 are aligned with the path of advancement of end portion 12 of the carpet roll across table 10. As the free end of the carpet roll is fed outwardly onto table 10 through the activation of drive motor 18 and drive means 16, eye 96 will first sense the end of the carpet as it passes thereunder causing the drive motor to reduce the feed rate of the carpet, thereby slowing the rate of advancement of the carpet across table 10. As the carpet end approaches eye 98 and is sensed thereby, drive motor 18 is stopped with the end portion 12 of the carpet coming to rest at a precise location upon table 10 over upper run 32 of belt 26. As eye 98 halts the advancement of carpet end portion 12, actuator 84 for hold-down plate 74 is activated to cause the plate to be lowered onto the upper surface of the carpet, pressing the carpet against the upper surface of upper belt run 32. End portion 12 of the carpet is not pressed so tightly against belt 26 that its advancement over table 10 will be retarded. A suitable pressure sensor (not shown) incorporated into actuator 84 serves to cause the actuator to hold the plate 74 against the upper surface of the carpet at a pressure of approximately four ounces per square inch. Belt 26 and sensing device 94 may be positioned as close to cutter 20 as is feasibly possible. Any distance between sensing device 94 and cutter 20 can be compensated for by including a correcting factor in indicator 60 and counter 64.

Once the advancement of carpet end portion 12 is so halted over belt 26, the operator of the carpet cutting device then sets counter 64 for a preselected length of carpet section. Also indicator 60 is set to reflect the nominal distance the free end of the carpet is from cutter 20. The carpet feed is then actuated causing end portion 12 of the stock roll to be fed over belt 26 which causes the rotation of the belt and rollers 28 and 30. The rotation of roller 30 causes a correlated indication of the feed length of the carpet to be registered by indicator 60 and counter 64. When about all but a few, such as two or three, inches of the preset desired length of carpet has passed over belt 26, the feed for the carpet is stopped and the carpet advanced by manual actuation of the feed motor in a creeping or slow motion until indicator 60 shows that the exact desired length of carpet has been reached. At this time the carpet feed is stopped and the cut button 72 depressed causing cutter 20 to separate the carpet into the exact length desired. After the cutter has severed the end portion from the remainder of the carpet stock roll, hold-down plate 74 is automatically raised. Depending upon the desired sequence, plate 74 can be raised during the cutting cycle. Drive belts 16 on table 10 are actuated once the cutting cycle is completed, causing the severed end portion of the carpet stock roll to be moved from under sensing device 94 to a take-up device or similar means for depositing the cut carpet section. As the cut section is separated from the remainder of the roll, the drive means 16 at the feed end 21 of the table is automatically actuated by a timed circuit to cause the free end of the carpet roll to be fed onto table 10 and under sensing device 94 where the carpet end is stopped and the measuring and cutting cycle above described repeated.

It is to be understood that the invention is not to be limited to the details herein given but may be modified within the scope of the appended claims.

What I claim is:

1. A metering device for indicating the length of flat flexible material comprising a support means having feed and discharge ends and a material supporting surface over which said material moves in advancing from the feed end to the discharge end of the support means, said supporting surface having an opening therein, an endless belt trained over first and second rotatable supports and having upper and lower runs, said belt positioned within said opening with its upper run paralleling the direction of material movement over said supporting surface, said upper belt run having a continuous upper surface means extending above said supporting surface in all operative rotative positions of said belt adapted for frictional contact with a lower surface of said material during movement of the material over the supporting surface whereby said belt will be caused to rotate during said material movement with said first and second belt supports experiencing rotative movement with said belt, and means operatively connected to the first of said belt supports and correlated to the amount of linear travel of said belt upper run for indicating the length of material moving over said belt and supporting surface, said first and second belt supports being spaced rollers, additional support means carried between said rollers and extending above the upper periphery of said rollers, said upper belt run contacting said additional support means and being positioned thereby above said rollers, said surface means of said upper belt run being planar and extending only over said additional support means, said rollers located below said supporting surface, said upper belt run having a slope between each roller and additional support means, said slope being sufficient to allow only said surface means of said upper belt run to so contact said material while maintaining a substantially rectilinear relationship between said material and said surface means as the material moves over said supporting surface, said supporting surface including conveying means for moving said material from the feed to the discharge end of the support means in a path paralleling said upper belt run, said belt having spaced marginal edges, said conveying means extending the length of said upper belt run and being located adjacent each of said marginal edges at the upper belt run.

2. The metering device of claim 1 wherein said additional support means is a plurality of cylindrical bearing members extending transversely of said upper belt run.

3. The metering device of claim 1 and means located over the opening in said supporting surface and positioned above said upper belt run for contacting said material and holding said material against said upper belt run as said material moves over said support surface.

4. The metering device of claim 3 wherein said holding means is shiftable into and out of contact with said material.

5. The metering device of claim 1 wherein said indicating means includes means providing a visual indication of the length of said material.

6. The metering device of claim 1 wherein said indicating means including means operatively connected to said conveying means for deactivating said conveying means to stop the advancement of said material over said supporting surface when a predetermined length of material has passed over said belt.

7. The metering device of claim 1 wherein said conveying means is a plurality of conveyor belts each paralleing said upper belt run.

8. A metering device for indicating the length of flat flexible material comprising a support means having feed and discharge ends and a material supporting surface over which said material moves in advancing from the feed end to the discharge end of the support means, said supporting surface having an opening therein, an endless belt trained over first and second rotatable supports and having upper and lower runs, said belt positioned within said opening with its upper run paralleling the direction of material movement over said supporting surface, said upper belt run having a continuous upper surface means extending at least to the plane of said supporting surface in all operative rotative positions of said belt adapted for frictional contact with a lower surface of said material during movement of the material over the supporting surface whereby said belt will be caused to rotate during said material movement with said first and second belt supports experiencing rotative movement with said belt, and means operatively connected to the first of said belt supports and correlated to the amount of linear travel of said belt upper run for indicating the length of material moving over said belt and supporting surface, said supporting surface including conveying means for moving said material from the feed to the discharge end of the support means in a path paralleling said upper belt run, said first and second belt supports being spaced rollers, additional support means carried between said rollers for supporting said upper belt run, spaced side plates journaling said rollers, said side plates having peripheral edges, the belt-engaging peripheries of said rollers projecting beyond the peripheral edges of said side plates, said belt having marginal edges overlapping in close proximity said peripheral edges.

9. The metering device of claim 8 wherein the marginal edges of said belt are spaced from the peripheral edges of said side plates.

* * * * *